(12) United States Patent
Brady et al.

(10) Patent No.: US 11,886,344 B2
(45) Date of Patent: Jan. 30, 2024

(54) CACHED SYSTEM FOR MANAGING STATE VECTORS

(71) Applicant: Xilinx, Inc., San Jose, CA (US)

(72) Inventors: Noel J. Brady, Dublin (IE); Lars-Olof B Svensson, Stockholm (SE)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/809,833

(22) Filed: Jun. 29, 2022

(65) Prior Publication Data

US 2024/0004794 A1    Jan. 4, 2024

(51) Int. Cl.
*G06F 12/0815* (2016.01)
*G06F 9/30* (2018.01)

(52) U.S. Cl.
CPC ........ *G06F 12/0815* (2013.01); *G06F 9/3004* (2013.01); *G06F 2212/1021* (2013.01)

(58) Field of Classification Search
None
See application file for complete search history.

(56) References Cited

U.S. PATENT DOCUMENTS

| | | | | |
|---|---|---|---|---|
| 8,825,982 | B2 * | 9/2014 | Kultursay | G06F 30/30 711/125 |
| 2005/0240745 | A1 * | 10/2005 | Iyer | G06F 13/1668 711/E12.079 |
| 2007/0113020 | A1 * | 5/2007 | Gunna | G06F 9/3861 711/146 |
| 2014/0281251 | A1 * | 9/2014 | Zhang | G06F 12/0826 711/133 |
| 2020/0264875 | A1 * | 8/2020 | Williams | G06F 9/3001 |
| 2022/0083475 | A1 * | 3/2022 | Onishi | G06F 12/0893 |
| 2022/0206945 | A1 * | 6/2022 | Beckmann | G06F 12/0862 |
| 2022/0365881 | A1 * | 11/2022 | Granovsky | G06F 12/0646 |
| 2022/0414013 | A1 * | 12/2022 | Alsop | G06F 12/0857 |

* cited by examiner

*Primary Examiner* — Kaushikkumar M Patel
(74) *Attorney, Agent, or Firm* — Kevin T. Cuenot

(57) ABSTRACT

A cache system includes a computational cache and a computational cache miss-handler. The computational cache is configured to cache state vectors and perform read-modify-write (RMW) operations on the cached state vectors responsive to received RMW commands. The computational cache miss-handler is configured to perform RMW operations on state vectors stored in a memory responsive to cache misses in the computational cache. The memory is external to the cache system.

18 Claims, 9 Drawing Sheets

CACHED SYSTEM FOR MANAGING STATE VECTORS

TECHNICAL FIELD

This disclosure relates to integrated circuits (ICs) and, more particularly, to a cache system for use with ICs and other electronic systems for managing state vectors.

BACKGROUND

A state vector is a block of data that may be modified over time by a process to track and reflect the state of the process. Many different types of applications rely on state vectors to operate. Some applications utilize a large number of state vectors, on the order of millions, for tracking purposes. Due to the large volume of state vector information maintained, the state vectors are stored in a memory such as a Dynamic Random Access Memory (DRAM). DRAM is characterized by low access rates and high access latencies that result in lower system performance.

State vectors may be updated by a processor such as a central processing unit (CPU). The processor issues a read request to retrieve a state vector from a cache memory. If a cache miss occurs, the processor retrieves the state vector from DRAM, which requires significant time. Whether retrieving the state vector from a cache memory or DRAM, the processor is stalled during this time. That is, the processor is unable to perform any other tasks while waiting for retrieval of the state vector. In response to receipt of the state vector, the processor modifies the state vector. The processor writes the modified state vector back to the cache memory and/or DRAM. This process can significantly degrade overall system performance. The number of such read-modify-write iterations performed per second, for example, depends on the read and write bandwidth of the DRAM being used.

In cases where the updating of a state vector depends on the current value of that state vector, updating by the processor is often paused until any prior update of that state vector completes. The pause often leads to underutilization of the available DRAM bandwidth. Even without having to wait to start a new read, modify, write iteration on the same vector, access constraints of the DRAM often penalize random state vector accesses thereby further underutilizing the DRAM bandwidth and further degrading system performance.

SUMMARY

In one or more example implementations, a system includes a cache system. The cache system includes a computational cache and a computational cache miss-handler. The computational cache is configured to cache state vectors and perform read-modify-write (RMW) operations on the cached state vectors responsive to received RMW commands. The computational cache miss-handler is configured to perform RMW operations on state vectors stored in a memory responsive to cache misses in the computational cache. The memory is external to the cache system.

In one or more example implementations, a method includes receiving, within a cache system, a read-modify-write (RMW) command from a processor. The method includes, in response to the RMW command, performing, using the cache system, an RMW operation on a state vector specified by the RMW command without further involvement of the processor.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to integrated circuits (ICs) and, more particularly, to a cache system for use with ICs and other electronic systems for managing state vectors. The inventive arrangements address the challenges described herein relating to memory accesses including those relating to memory (e.g., DRAM) bandwidth and latency. In accordance with the inventive arrangements described within this disclosure, methods and systems for implementing read-modify-write (RMW) operations are disclosed. The techniques may be used to perform high-speed RMW operations. The RMW operations may be performed on large state vector data structures (e.g., tables) while providing a high degree of performance.

In one or more examples, a cache system is disclosed. The cache system is operative with a processor and a memory. The cache system is capable of executing RMW commands received from the processor. The cache system is capable of performing the read, modify, and write operations for managing state vectors responsive to the RMW commands. Further, the cache system is capable of performing the read, modify, write operations responsive to the RMW commands without any further involvement of the processor.

The cache system may include a computational cache that is capable of automatically caching selected state vectors locally in a computational cache memory. The computational cache further includes circuitry that is capable of performing read, modify, and write operations on cached state vectors stored in the computational cache memory responsive to RMW commands. The computational cache memory may be implemented as a high-performance on-chip cache memory.

The cache system can include a computational cache miss-handler. The computational cache miss-handler is operable, in response to cache misses in the computational cache, to access the memory (e.g., a DRAM) storing the state vectors to perform the RMW operations specified by the RMW commands. In one aspect, the computational cache miss-handler is capable of multithreaded operation.

The computational cache miss-handler also is capable of performing other functions to be described herein in greater detail that improve utilization of memory bandwidth. These functions may include, but are not limited to, RMW command coalescing, sequential vector read command batching, and/or other techniques. Further aspects of the inventive arrangements are described below with reference to the figures.

Figure 1:
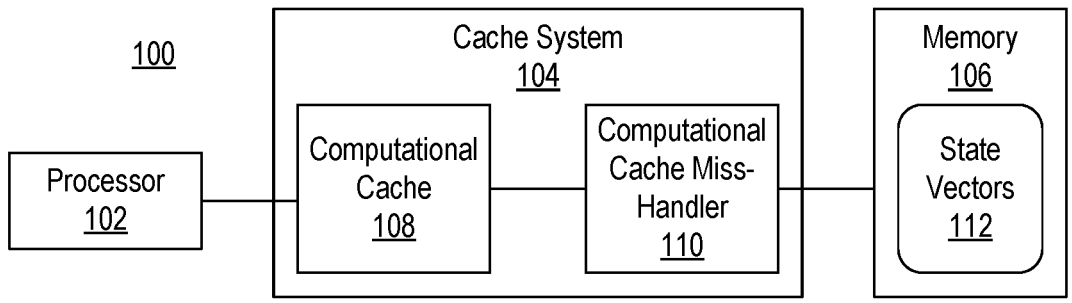
FIG. 1 illustrates an example of a system configured in accordance with the inventive arrangements described within this disclosure.

FIG. 1 illustrates an example of a system 100 configured in accordance with the inventive arrangements described within this disclosure. System 100 includes a processor 102, a cache system 104, and a memory 106. Cache system 104 includes a computational cache 108 and a computational cache miss-handler 110. In the example of FIG. 1, memory 106 is configured to store state vectors 112. Each state vector may be a particular number of bits in width. Each state vector may include one or more fields therein. For example, state vectors 112 may be stored in memory 106 as a table or other suitable data structure.

In one or more examples, system 100 may be implemented as part of a computer system. For example, processor 102 may be implemented as a central processing unit (CPU) or other processor that is capable of executing computer-readable program instructions. Memory 106 may be a DRAM. In such an example, each of processor 102, cache system 104, and memory 106 may be implemented as an IC.

In one or more examples, system 100 may be implemented within an accelerator card that is communicatively linked to a computer. For example, system 100 may be implemented as a network-interface card (NIC). In such an example, each of processor 102, cache system 104, and memory 106 may be implemented as a separate IC disposed on the accelerator card. The accelerator card may be used to process received data streams and may communicate with the host processor of the computer.

In one or more examples, processor 102 and cache system 104 may be implemented in a single IC. Memory 106 may be implemented as an external memory. For example, memory 106 may be implemented as a DRAM as one or more ICs that are separate from the IC implementing processor 102 and cache system 104.

In one or more example implementations, system 100 may be used as part of an application executing across one or more interconnected computers that is capable of performing packet processing, delivering video streams to user devices, delivering audio streams to user devices, or the like. Such systems, among others, often rely on the continued updating of state vectors for tracking the state of the system and/or application. For example, such applications may rely on system 100 for counting the amount of data, e.g., packets, delivered for a particular application and/or user device.

As an illustrative and non-limiting example, each state vector may be used as a counter to track a number of occurrences of a particular event or events. In one aspect, each event (e.g., of N different events) may correspond to a different state vector maintained in state vectors 112. An example of an event is the arrival of a packet from a particular application or packet stream (e.g., video stream, audio stream, FTP transfer, etc.). Packets arriving from different applications or packet streams may correspond to different events. Thus, in one or more examples, the state vectors 112 form a table of counters (e.g., packet counters in this example). Appreciably, cache system 104 must operate in an efficient manner to track the number of events that occur per unit time. In some cases, cache system 104 is capable of performing millions (e.g., hundreds of millions) of RMW operations per second. Other examples may use state vectors to count bytes or other events and/or quantities.

In the example of FIG. 1, processor 102 is configured to issue or submit RMW commands to cache system 104. Each RMW command may specify a particular state vector to be updated and a modification to be performed on the specified state vector. Receipt of an RMW command by cache system 104 from processor 102 causes cache system 104 to perform a read operation to obtain the specified state vector, modify the state vector in accordance with the RMW command, and perform a write operation to write the state vector as modified back to a memory. An RMW command will specify a particular vector to be modified and the way in which the vector is to be modified. For example, an RMW command may specify a particular vector by specifying an index of the vector in state vectors 112. The index uniquely specifies the vector. For example, the index may specify the position of the vector within state vectors 112 and/or each state vector of state vectors 112 may include a vector index. The RMW command may also specify that the vector specified by the index is to be incremented by a particular value.

Cache system 104 relieves processor 102 from fetching the state vector, modifying the state vector, and writing the state vector as modified to memory. As such, upon issuing an RMW command to cache system 104, processor 102 does not await any confirmation or further communication from cache system 104 as to the state of the RMW command or operation. Processor 102, having issued the RMW command, is able to continue performing one or more other tasks. That is, processor 102 is neither performing the RMW operation itself nor waiting for the RMW operation to complete.

Figure 2:
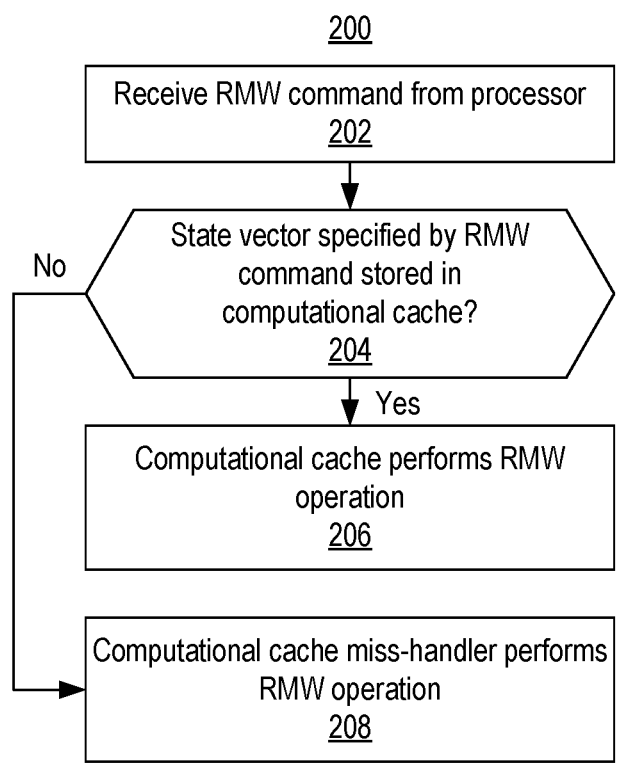
FIG. 2 illustrates an example method of operation of the cache system of FIG. 1.

FIG. 2 illustrates an example method of operation of cache system 104. Referring to FIGS. 1 and 2, processor 102 is adapted to issue RMW commands to cache system 104. Cache system 104 is capable of executing the RMW commands to perform corresponding RMW operations. Cache system 104 is capable of performing the RMW operations without any further involvement from processor 102.

In block 202, cache system 104 receives an RMW command from processor 102. More particularly, computational cache 108 receives the RMW command. In block 204, computational cache 108 determines whether the state vector specified by the received RMW command is located, e.g., cached, in computational cache 108. In response to determining that the state vector is stored in computational cache 108, method 200 continues to block 206. In block 206, computational cache 108 executes the RMW command and performs the RMW operation. In response to determining that the state vector is not stored in computational cache 108 (e.g., detecting a cache miss), method 200 continues to block 208. In block 208, computational cache miss-handler 110 executes the RMW command and performs the RMW operation.

Figure 3:
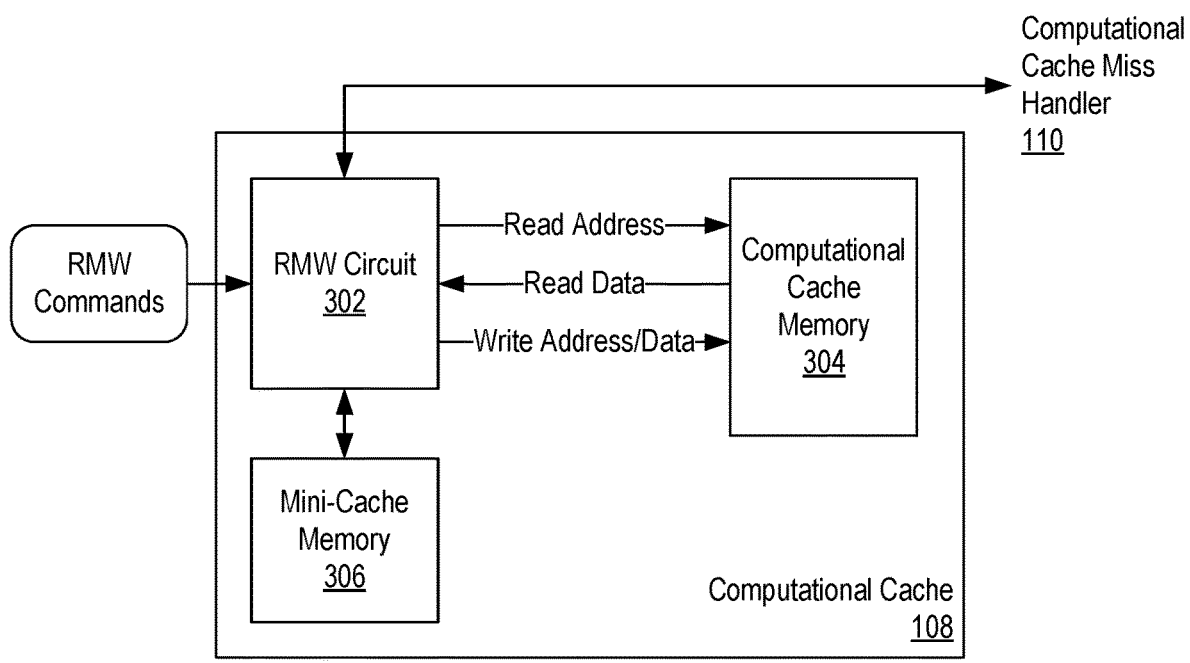
FIG. 3 illustrates an example implementation of the computational cache of FIG. 1.
Figure 4:
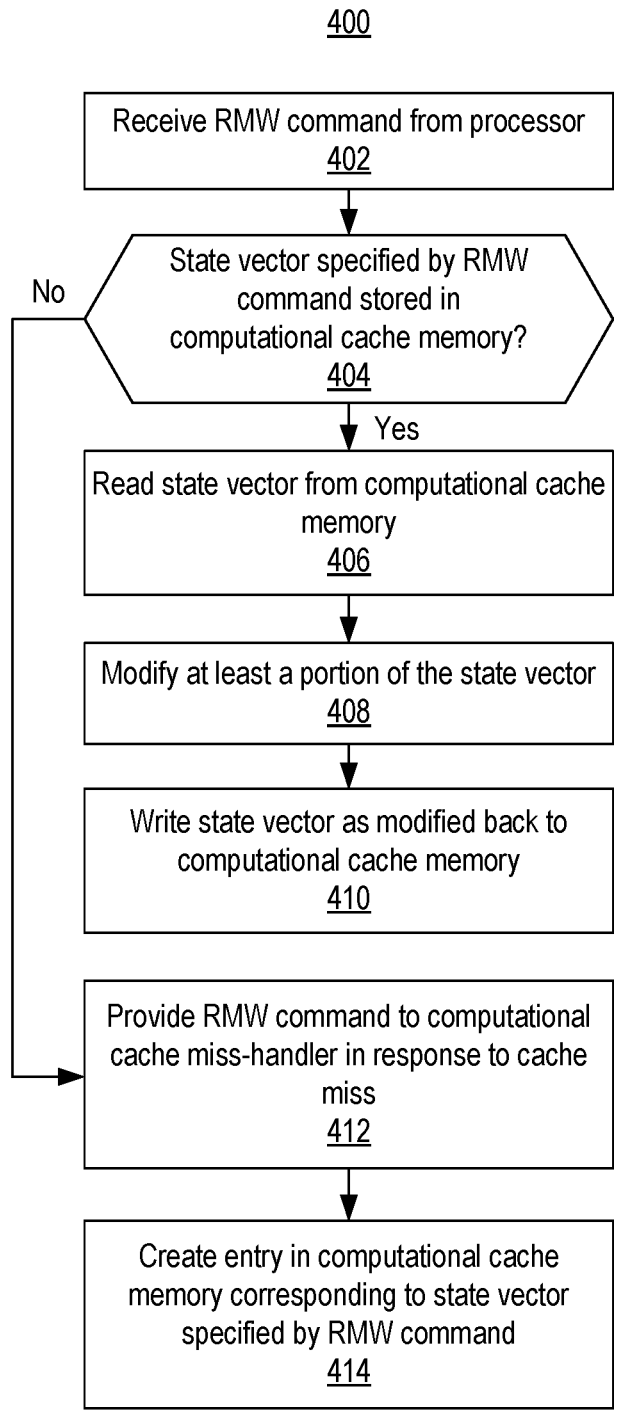
FIG. 4 illustrates an example method demonstrating certain operative features of the computational cache of FIG. 1.

FIG. 3 illustrates an example implementation of computational cache 108 of FIG. 1. FIG. 4 is a method 400 illustrating certain operative features of computational cache 108. Referring to FIGS. 3 and 4, computational cache 108 includes an RMW circuit 302, a computational cache memory 304, and an optional mini-cache memory 306. In one or more example implementations, computational cache memory 304 may be implemented as an on-chip memory such as an SRAM. In one or more other example implementations, mini-cache memory 306 may be implemented as one or more registers.

In block 402, RMW circuit 302 is capable of receiving an RMW command from processor 102. In block 404, RMW circuit 302 is capable of determining whether the state vector specified by the received RMW command is stored in computational cache memory 304. In response to determining that the state vector specified by the received RMW command is stored in computational cache memory 304 (e.g., a cache hit), method 400 continues to block 406. In response to determining that the state vector specified by the received RMW command is not stored in computational cache memory 304 (e.g., a cache miss), method 400 proceeds to block 412.

In block 406, RMW circuit 302 is capable of reading the state vector from computational cache memory 304. For example, RMW circuit 302 provides a read address to computational cache memory 304 and receives the state vector as read data. In block 408, RMW circuit 302 is capable of modifying at least a portion of the state vector read from computational cache memory 304. The RMW circuit 302 may modify the state vector as a whole, one or more particular fields of the state vector, or other bits and/or portions. The modification performed is specified by the received RMW command. In block 410, RMW circuit 302 is capable of writing the state vector as modified back to computational cache memory 304.

In one or more example implementations, RMW circuit 302 is capable of performing one or more arithmetic operations. In one aspect, the number of operations performed by RMW circuit 302 may be limited to keep the complexity of the circuit low. As described, RMW circuit 302 is capable of performing reads of computational cache memory 304 and writes of computational cache memory 304. In addition, RMW circuit 302 is capable of performing addition operations (e.g., increment) on state vectors and/or particular field(s) of state vectors, subtraction (e.g., decrement) operations on state vectors and/or particular field(s) of state vectors, and/or overwrite operations (e.g., zeroing or clearing operations) on state vectors and/or particular fields of state vectors. Thus, RMW circuit 302 is located near computational cache memory 304 and is capable of performing not only read and write operations, but also certain operations to modify data contained in computational cache memory 304. Inclusion of RMW circuit 302 relieves processor 102 from performing such operations.

Because RMW circuit 302 is located so close to computational cache memory 304, the processing latency of an RMW operation may be reduced to approximately 6-8 clock cycles. The reduced and well-bounded latency of RMW operations means that there are few outstanding RMW operations. Consequently, the searching for RMW operations that are outstanding becomes less complex and significantly faster. In consequence, RMW operations on cached state vectors can be implemented at a rate of at least one operation per clock cycle without pipeline stalls and with very low hardware cost. For example, a throughput of one RMW operation per clock cycle may be achieved where RMW circuit 302 includes a pipeline capable of processing multiple RMW commands concurrently. A latency of 6 clock cycles, for example, may be achieved with a pipeline in RMW circuit 302 that is capable of operating on 6 RMW commands concurrently.

In the case of a cache miss, in block 412, RMW circuit 302 is capable of providing the RMW command to computational cache miss-handler 110. Computational cache miss-handler 110 is capable of performing operations similar to those of RMW circuit 302 albeit using memory 106 rather than computational cache memory 304 to execute the RMW command. As such, even in the case of a cache miss, processor 102 is still relieved of having to perform the actual read, modify, and write of the state vector.

In block 414, RMW circuit 302 is capable of creating an entry corresponding to the state vector associated with the cache miss. In response to the cache miss, RMW circuit 302 is capable of creating a version of the state vector, specified by the RMW command, that was not found in computational cache memory 304. That is, the resulting state vector as updated in memory 106 is not written or provided back to computational cache 108 in response to a cache miss.

In one or more example implementations, RMW circuit 302 is capable of performing block 414 by creating a zero-valued state vector (e.g., a state vector having a zero value or a blank entry) in computational cache memory 304 for the particular state vector not found therein. That is, in response to determining that a state vector specified by the received RMW command is not within computational cache memory 304, RMW circuit 302 creates an entry in computational cache memory 304 for the state vector. The entry specifies a zero valued state vector as another version of the state vector that is the subject of the cache miss. For ease of reference, the created state vector is referred to herein as a zero-valued state vector. While the zero-valued state vector is initially zero-valued, the state vector may be modified responsive to further RMW commands.

In the example of FIG. 4, though blocks 412 and 414 are illustrated as being performed sequentially, in another example implementation, blocks 412 and 414 may be performed in parallel. Such may be the case where the state vector being stored in the computational cache 108 has a zero value as may be implemented in the case of a counter-based state table.

This technique for caching state vectors within computational cache memory 304 leads to system 100 maintaining multiple versions for certain state vectors. More particularly, for any state vector that is cached in cache system 104, the state vector will have one version stored in computational cache memory 304 and another version stored in memory 106. The two versions do not match.

In response to receiving a subsequent RMW command specifying the same state vector (e.g., while the zero-valued state vector or an updated version thereof is stored in computational cache memory 304), RMW circuit 302 detects a cache hit. In that case, RMW circuit 302 operates on the version of the state vector stored in computational cache memory 304. For example, in response to the subsequent RMW command, RMW circuit 302 may read the cached state vector from computational cache memory 304, modify the cached state vector per the RMW command, and write the modified state vector back to computational cache memory 304. The cached state vector is not reconciled with the version of the state vector stored in memory 106 at least until the time that the state vector is read out from system 100 and/or expelled from computational cache memory 304. Read operations and expulsion are described in greater detail hereinbelow.

Caching state vectors using the zero-valued state vector mechanism described herein avoids scenarios where the cache system 104 causes an upstream stall of processor 102 because cache system 104 is busy fetching data from memory 106 in the case of a cache miss.

In one or more example implementations, mini-cache memory 306 may be implemented as a small, special purpose on-chip memory. For example, mini-cache memory 306 may be implemented to store approximately 6-8 entries (e.g., state vectors). Inclusion of mini-cache memory 306 enables single cycle RMW command execution in cases where a new state vector value depends on a prior state vector value. For example, in cases where a plurality of RMW commands are received by RMW circuit 302 within a defined time window, RMW circuit 302 may utilize mini-cache memory 306 to execute the RMW operations specified by the RMW commands. The state vector may be stored in mini-cache memory 306. In one or more example implementations, RMW circuit 302 is capable of updating the computational cache memory 304 with the state vector as modified from mini-cache memory 306.

For example, in cases where RMW commands specifying a same state vector are received back-to-back (e.g., sequentially) or are received before RMW circuit 302 is finished performing a prior RMW operation on the state vector using computational cache memory 304, RMW circuit 302 is capable of using mini-cache memory 306 in lieu of computational cache memory 304.

Figure 5:
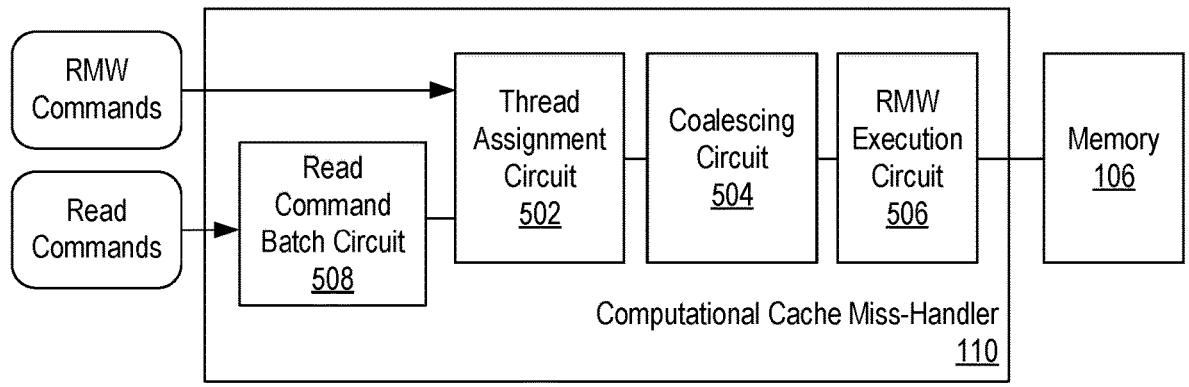
FIG. 5 illustrates an example implementation of the computational cache miss-handler of FIG. 1.
Figure 6:
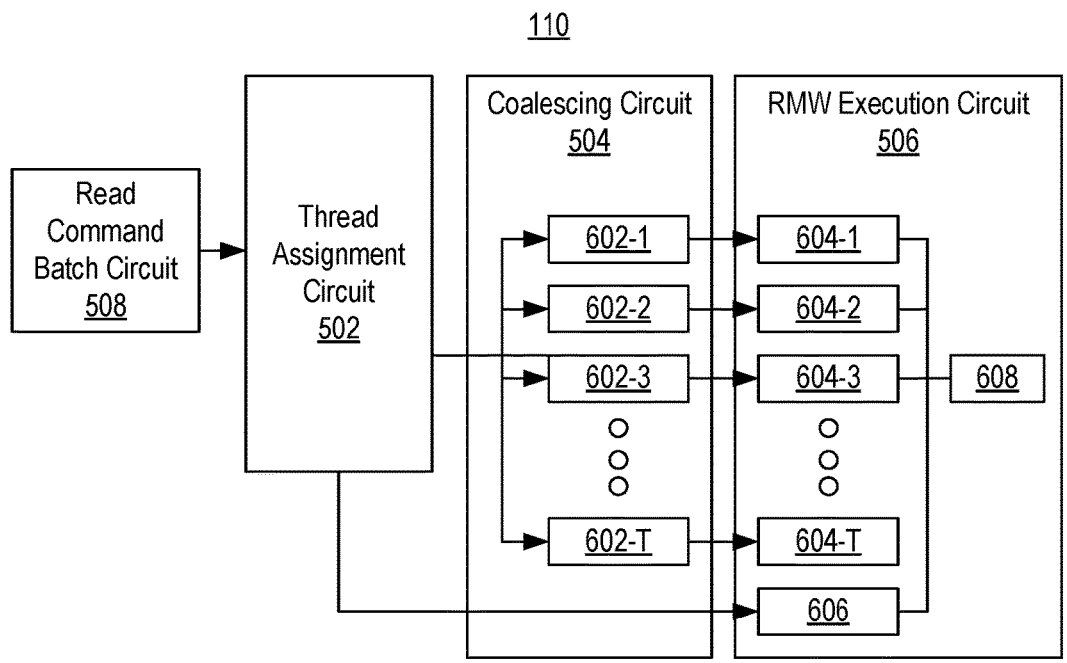
FIG. 6 illustrates another example implementation of the computational cache miss-handler of FIG. 1.
Figure 7:
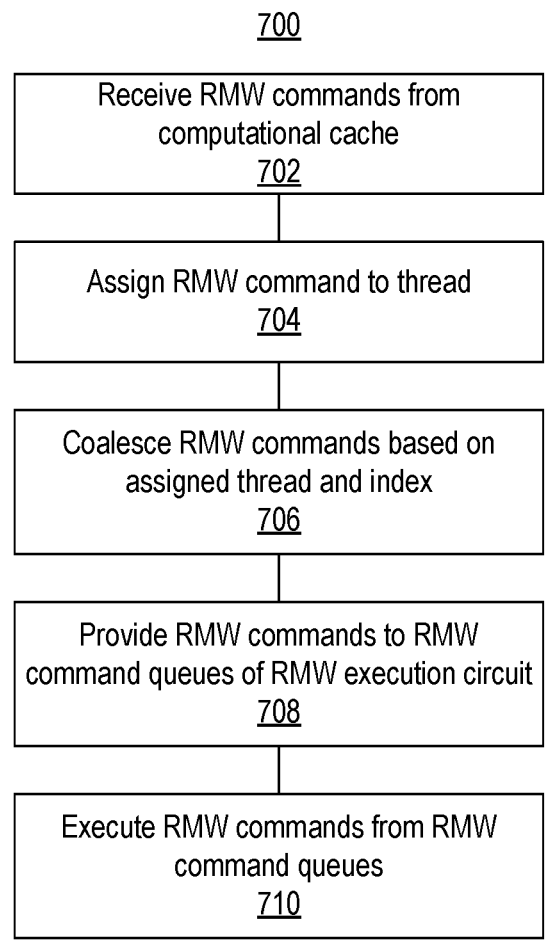
FIG. 7 illustrates an example method of operation for the computational cache miss-handler of FIG. 1.

FIG. 5 illustrates an example implementation of computational cache miss-handler 110 of FIG. 1. FIG. 6 illustrates another example implementation of computational cache miss-handler 110. FIG. 7 illustrates an example method 700 of operation for computational cache miss-handler 110.

Referring to FIGS. 5, 6, and 7, computational cache miss-handler 110 includes a thread assignment circuit 502, a coalescing circuit 504, and an RMW execution circuit 506. Computational cache miss-handler 110 also may include a read command batch circuit 508. As illustrated, RMW execution circuit 506 is coupled to memory 106. In one or more example implementations, RMW execution circuit 506 is coupled to memory 106 via a memory controller (not shown). Coalescing circuit 504 includes a plurality of coalescers 602. RMW execution circuit 506 includes a plurality of RMW command queues 604, a read command queue 606, and RMW logic 608.

In block 702, computational cache miss-handler 110 receives RMW commands from computational cache 108. More particularly, thread assignment circuit 502 is capable of receiving RMW commands from computational cache 108. For example, in the event of a cache miss in computational cache 108, RMW circuit 302 provides the RMW command to thread assignment circuit 502.

In block 704, thread assignment circuit 502 is capable of assigning each of the received RMW commands to one of a plurality of threads. For example, computational cache 108 may support up to "T" different threads, where T is an integer value. In one example implementation, T may be 64, though the inventive arrangements are not intended to be limited by the particular number of threads supported.

As noted, each RMW command specifies a particular index. The index specifies a state vector within the data structure including state vectors 112 in memory 106. For example, the index may specify the position or location of the state vector within state vectors 112. Thus, the index uniquely identifies a particular state vector. Thread assignment circuit 302 is capable of assigning each RMW command to a particular thread based on the index specified by the RMW command. In one aspect, thread assignment circuit 302 is capable of adding to the RMW command a thread identifier (ID) specifying the thread to which the RMW command is assigned. The thread ID may be added to the RMW command by appending the thread ID to the RMW command, prepending the thread ID to the RMW command, or inserting the thread ID within the RMW command.

In some applications, a large number of state vectors may be maintained and exceed the number of threads T in the system. In such cases, the index to thread mapping may be a many to one mapping where RMW commands specifying different state vectors may be assigned to a same thread based on the indices specified by the respective RMW commands. As such, each thread has the responsibility of operating on some distinct subset of state vectors 112.

In one aspect, thread assignment circuit 302 is capable of maintaining a table or other data structure that maps each state vector, e.g., by index, to a particular thread. In another aspect, thread assignment circuit 302 is capable of using particular bits of the index of the RMW command as the thread ID (e.g., for determining the thread to which the RMW command is assigned). For example, in the case where a single read of memory 106 returns B different sequential state vectors and B=4, the LOG 2(B) least significant bits (e.g., index [1:0]) of the index may not be used for thread assignment. Thread assignment must be independent of the two least significant bits. In one aspect, the next LOG 2(T) least significant bits (e.g., bits 7 down to 2 of the index) may be used as the thread and thread ID. In this example the number of threads T is 64.

For purposes of illustration, consider an example where a read of state vector 0 also returns state vectors 1, 2, and 3 (e.g., B=4). In this case, a read of one state vector returns B−1 other state vectors. If, for example, an RMD operation is directed to state vector 0, then RMW operations directed to state vectors 1, 2, and 3 must be avoided until the RMW operation directed to state vector 0 completes to avoid corruption of the state vectors. Thus, in one or more example implementations, the index to thread mapping may be performed using the next LOG 2(T) least significant bits (e.g., bits 7 down to 2 of the index) of the index following the LOG 2(B) least significant bits of the index specified by the RMW command thereby ensuring that, in the example where B=4, RMW commands directed to vectors 0, 1, 2, and 3 are assigned to the same thread. Further details regarding thread assignment are described below.

In block 706, RMW commands may be coalesced. For example, the RMW commands, as assigned or belonging to particular threads, are provided from thread assignment circuit 502 to coalescing circuit 504. Coalescing circuit 504 is capable of analyzing received RMW commands based on the assigned threads and indices. Coalescing circuit 504 is capable of coalescing RMW commands that are assigned or belong to the same thread, that are received within a predetermined or specified window of time, and that have a same index. As an illustrative and non-limiting example, coalescing circuit 504 is capable of receiving a plurality of RMW commands for a same thread within the window of time and determining selected ones of the RMW commands having a same index. Since the selected RMW commands are of a same thread and have a same index, each of the selected RMW commands specifies the same state vector.

For example, a first of the selected RMW commands may increment the state vector by one. A second of the selected RMW commands may increment the same state vector by two. In this example, coalescing circuit 504 is capable of combining the two selected RMW commands into a single RMW command that increments the state vector by three. In other words, coalescing circuit 504 generates a new RMW command that increments the state vector by three and discards the first and second selected RMW commands. This reduces the number of RMW commands that will be executed by RMW execution circuit 506 particularly in scenarios where there are bursts of RMW commands specifying the same index (e.g., directed to the same state vector). Coalescing circuit 504 effectively reduces the number of RMW operations to be performed and the rate of RMW operations to be processed.

In one aspect, the number of coalescers 602 may be equal to the number of threads T implemented in computational cache 108. In this regard, coalescing circuit 504 is capable of having T different coalescers 602 operating in parallel. Each coalescer 602 is capable of operating on RMW operations assigned to a particular and same thread T. Each coalescer 602, however, coalesces only those RMW commands of the thread that are received within the window of time and that specify a same index (e.g., operate on a same state vector). For example, each coalescer 602 may include a queue that is configured to store RMW operations assigned to a same thread and store the RMW operations received within a specified window of time. Each coalescer 602 also includes logic that is capable of merging or coalescing RMW operations in a same thread, that occur within the window of time, and that specify a same state vector into a single RMW operation. Each coalescer 602 is capable of outputting the resulting coalesced RMW operation to RMW execution circuit 506.

In block 708, the RMW commands are provided to the respective RMW command queues 604 of RMW execution circuit 506. The number of RMW command queues 604 may be equal to the number of threads T supported by computational cache miss-handler 110. The RMW commands are stored in the respective RMW command queues 604 based on the thread ID of the respective RMW commands. In block 710, the commands are executed from the command queues 604.

RMW execution circuit 506 is capable of executing the RMW commands from the RMW command queues 604 using a selected arbitration technique. In one example, the arbitration technique is round robin. For example, RMW logic 608 is capable of pulling RMW operations from RMW command queues 604 using the selected arbitration technique. RMW logic 608 is capable of executing the RMW commands as pulled from the RMW command queues 604. That is, for a given RMW command obtained from a selected RMW command queue 604, RMW logic 608 is capable of reading the specified state vector from memory 106, modifying at least a portion of the state vector as read from memory 106 in accordance with the RMW command, and writing the state vector as modified back to memory 106.

In one or more example implementations, RMW logic 608 is capable of performing one or more arithmetic operations. In one aspect, the number of operations performed by RMW logic 608 may be limited to keep the complexity of the circuit low. In one or more examples, RMW logic 608 is capable of performing reads of memory 106 and writes of memory 106. RMW logic 608 is also capable of performing addition operations (e.g., increment) on state vectors and/or particular field(s) of state vectors, subtraction (e.g., decrement) operations on state vectors and/or particular field(s) of state vectors, and/or overwrite operations (e.g., zeroing operations) on state vectors and/or particular fields of state vectors. Thus, RMW logic 608 is capable of performing not only read and write operations, but also certain operations to modify data contained in memory 106 thereby relieving processor 102 from performing such operations.

In one or more example implementations, each RMW command queue 604 is not permitted to have more than one outstanding RMW operation at any given time. That is, as RMW logic 608 services RMW command queues 604, if a particular RMW command queue 604-1 has an RMW command that is being executed by RMW logic 608, then RMW logic 608 will not process another RMW command from RMW command queue 604-1 until the RMW command currently executing completes execution.

Referring to the prior example where multiple state vectors may be read and/or written responsive to a single read and/or write command, any RMW commands directed to a same state vector or directed to state vectors that are read and/or written by a single read and/or write command will be stored in the same RMW command queue 604. RMW command queues 604 enforce an ordering of the RMW commands. Allowing only one outstanding RMW command for each RMW command queue 604 at any given time ensures that there will not be multiple RMW operations concurrently in progress attempting to access and/or modify a same state vector (e.g., leading to data corruption). This also ensures that, referring to the prior example, a RMW command directed to state vector 0 will not conflict with an RMW operation directed to state vectors 1, 2, or 3 (referring to the example where B=4) since each such RMW operation will be in the same RMW command queue 604. It should be appreciated that B may be a value other than four and will depend on the particular memory and/or memory controller used.

In another aspect, each of RMW command queues 604 may be mapped to a particular memory bank of memory 106. For example, if memory 106 has 8 memory banks, RMW command queues 604 may be mapped to the 8 memory banks with RMW command queue 604-1 being mapped to memory bank 1, RMW command queue 604-2 being mapped to memory bank 2, RMW command queue 604-3 being mapped to memory bank 3, and so forth. The mapping may continue and loop back such that RMW command queue 604-9 is mapped to memory bank 1 and continue as described. With the example mapping of RMW command queues 604 to memory banks, RMW logic 608 may pull RMW commands from RMW command queues 604 sequentially and avoid consecutive memory operations to a same memory bank thereby optimizing utilization and performance of memory 106. In other words, pulling RMW commands from RMW command queues sequentially maximizes the time elapsed between memory operations to the same bank thereby optimizing utilization and performance of memory 106.

In the examples described, each thread can have only one outstanding RMW operation at a time. Because cache system 104 may be designed with a desired or arbitrary number of threads, there may be an arbitrary number of outstanding RMW operations at any given time. This capability addresses the latency issues discussed with respect to conventional RMW implementations. Further, the inventive arrangements described herein may be scaled up without incurring expensive large-scale searching to avoid data corruption in the state vectors.

The multi-threaded processing performed by computational cache miss-handler 110 is capable of operating more efficiently and effectively when the operational load, e.g., the RMW commands, are divided evenly across all threads T. If, for example, a single thread is overloaded, the whole flow of RMW command processing may be halted. Operation of coalescing circuit 504 to coalesce a plurality of RMW commands into a single RMW command as described herein addresses the overloading of a particular thread. Operation of coalescing circuit 504 effectively compresses the workload into fewer RMW commands to avoid overflowing the RMW command queues 604.

Figure 8:
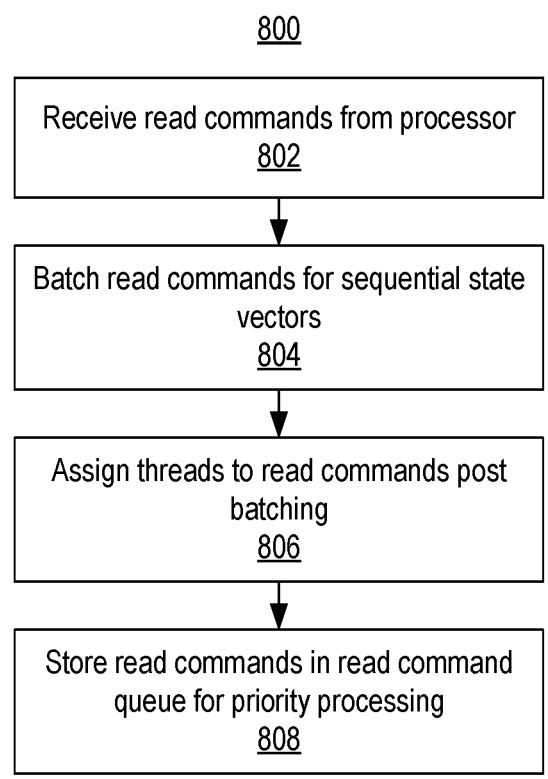
FIG. 8 illustrates an example method of processing read commands by the computational cache of FIG. 1.

FIG. 8 illustrates an example method 800 of processing read commands within computational cache 108. In block 802, read command batch circuit 508 receives one or more read commands from processor 102. In block 804, read command batch circuit 508 is capable of batching read commands specifying sequential state vectors into a single read command. Typically, state vectors are read out from memory 106 sequentially. This allows batching of read commands to exploit spatial locality of state vectors as stored in memory 106.

For example, as discussed, a read operation to memory 106 may retrieve more data than is contained in a single state vector. For purposes of illustration, if memory 106 is configured to communicate 512 bits of data in response to a read command and a state vector is 64 bits, each read is capable of retrieving more than one state vector. Batching read commands that specify sequential state vectors allows multiple read commands to be combined into a single read command that retrieves multiple sequential state vectors from memory 106. Continuing with the prior example of a 512-bit read operation and 64-bit state vectors, read command batch circuit 508 is capable of combining eight read commands that access eight sequential state vectors into a single read command that retrieves all eight state vectors. In this example, B=8. The particular bit widths of state vectors and of reads are provided for purposes of illustration and not limitation.

In block 806, the read commands, as batched, may be assigned to a particular thread. For example, read command batch circuit 508 is capable of providing the read commands, as batched, to thread assignment circuit 502. Thread assignment circuit 502 is capable of performing thread assignment for the received read commands as batched.

For example, in the case where a single read operation recovers B state vectors from memory 106 and there are T threads, the LOG 2(B) least significant bits of the index may not be used for thread assignment. Rather, the next LOG 2(T) least significant bits are used for the thread assignment. In the example where B=8 and T=64, then a 6-bit thread ID may be used and assigned to the read commands (and RMW commands) as bits 8 down to 3 of the index. In the case of read commands that are batched, the index of the first read command in the batch is used. For example, given a sequence of batched read commands with the first indexes of 0, 8, 16, 24, etc., the batched read commands will be assigned threads 0, 1, 2, 3, etc. The assignment of threads (and thread IDs) is sequential as are the read commands.

In block 808, the read commands, as batched, are stored in read command queue 606. In general, read commands stored in read command queue 606 are processed with priority over the RMW commands of like thread as stored in RMW command queues 604. As illustrated in FIG. 6, while RMW execution circuit 506 includes a plurality of RMW command queues 604, RMW execution circuit 506 may include a single read command queue 606. Thus, all read commands are placed in a same read queue regardless of thread assignment.

Figure 9:
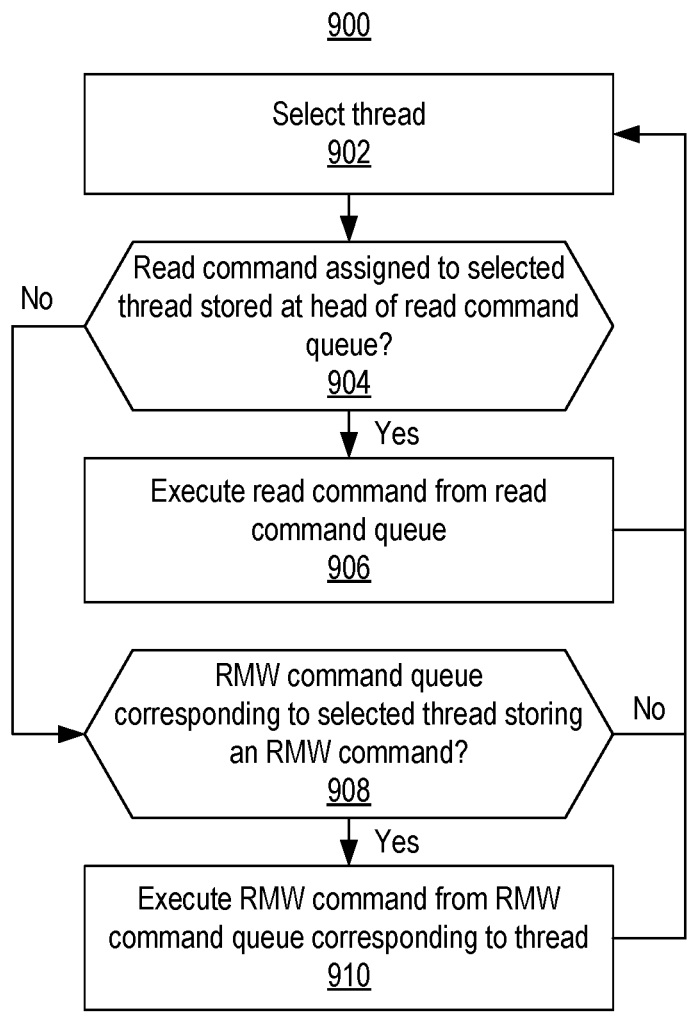
FIG. 9 illustrates an example method of processing read commands and read-modify-write (RMW) commands.

FIG. 9 illustrates an example method 900 of executing RMW commands and read commands. Method 900 may be performed by RMW logic 608 and is illustrative of an example arbitration technique and priority processing of read commands that may be used. In block 902, RMW logic 608 selects a particular thread (or thread ID as may be the case). As discussed, the threads map onto the different RMW command queues 604. In this regard, the selection of a particular thread also selects a particular RMW command queue 604. The selection of a thread may be performed in accordance with the selected arbitration technique. In this example, the arbitration technique is round robin.

In block 904, RMW logic 608 determines whether a read command assigned to the selected thread is stored at the head of read command queue 606. In response to determining that read command queue 606 is storing, at the head of the queue, a read command assigned to the selected thread, method 900 continues to block 906. In block 906, RMW logic 608 is capable of executing the read command from read command queue 606. Method 900 prioritizes read commands assigned to the selected thread over RMW commands assigned to the selected thread. After block 906, method 900 loops back to block 902 to select a next thread to continue with the round robin arbitration.

In response to determining that read command queue 606 is not storing a read command assigned to the selected thread at the head of read command queue 606, method 900 continues to block 908. In block 908, RMW logic 608 is capable of determining whether the RMW command queue corresponding to the selected thread stores, or includes, an RMW command (e.g., one or more RMW commands). In response to determining that the RMW command queue corresponding to the selected thread includes an RMW command, method 900 continues to block 910. In response to determining that the RMW command queue corresponding to the selected thread does not include an RMW command (e.g., is empty), method 900 loops back to block 902 to select a next thread and continue with round-robin arbitration.

Continuing with block 910, RMW logic 608 is capable of executing an RMW command from the RMW command queue 604 corresponding to the thread ID. After block 910, method 900 loops back to block 902 to select a next thread ID and continue with round robin arbitration.

For example, consider the case where read command queue 606 stores read commands assigned to threads 3, 4, and 5. The read commands are stored in thread sequential order with the read command of thread 3 being stored at the head of read command queue 606. Also, RMW logic 608 selects thread 2 (e.g., in block 902). In that case, since read command queue 606 does not store a read command of thread 2 at the head (or top) of read command queue 606, RMW logic 608 checks whether the RMW command queue 604 corresponding to thread 2 is storing any RMW commands. In response to determining that the RMW command queue 604 corresponding to thread 2 is storing one or more RMW commands, RMW logic 608 pops an RMW command from the RMW command queue 604 for thread 2 and executes the RMW command.

Next, RMW logic 608 selects thread 3. In that case, RMW logic 608 pops the read command for thread 3 from read command queue 606 and executes the read command. Next, RMW logic 608 selects thread 4. In that case, RMW logic 608 pops the read command for thread 4 from read command queue 606 and executes the read command. Next, RMW logic 608 selects thread 5. In that case, RMW logic 608 pops the read command for thread 5 from read command queue 606 and executes the read command.

Next, RMW logic 608 selects thread 6. Since read command queue 606 does not store a read command for thread 6 at the head of read command queue 606, RMW logic 608 checks whether the RMW command queue 604 corresponding to thread 6 is storing any RMW commands. In response to determining that the RMW command queue 604 corresponding to thread 6 is storing one or more RMW commands, RMW logic 608 pops an RMW command from the RMW command queue 604 for thread 6 and executes the RMW command. Thus, the command executed by RMW logic 608 in order are RMW command of thread 2, read command of thread 3, read command of thread 4, read command of thread 5, and then RMW command of thread 6.

In the example of FIG. 9, sequential index batched read commands will produce sequential thread IDs. This causes read operations initiated from execution of the read commands to loop over the memory banks of memory 106 to maximize access rate of memory 106 and avoid head of line blocking of the read command queue when exposed to round robin thread arbitration.

Figure 10:
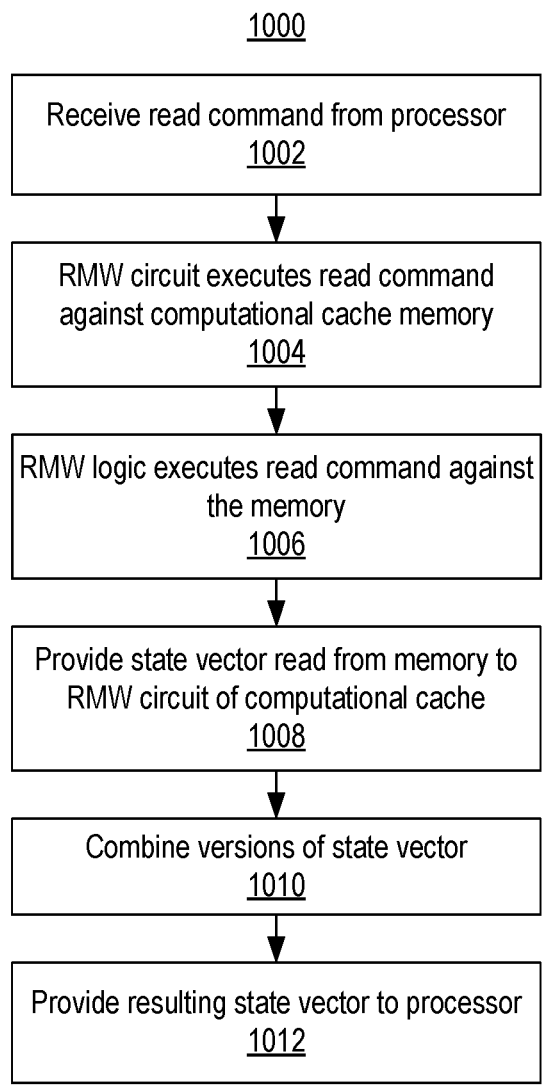
FIG. 10 illustrates an example method of performing a read operation.

FIG. 10 illustrates an example method 1000 of performing a read operation. As discussed, in certain example implementations, cache system 104 caches state vectors by creating a zero-valued state vector initially in computational cache memory 304 and operating on that version of the state vector without reconciling the cached version of the state vector with the version of the state vector stored in memory 106. In performing read operations or expelling a state vector from computational cache memory 304, the two versions of the state vector are reconciled. Method 1000 illustrates an example technique for combining a cached version of a state vector with the version of the state vector stored in memory 106.

In block 1002, a read operation is received by cache system 104. The read command may be received by computational cache 108 and also provided to computational cache miss-handler 110. In block 1004, RMW circuit 302 is capable of executing the read command on computational cache memory 304. For example, RMW circuit 302 is capable of reading the state vector specified by the received read command from computational cache memory 304. If the state vector specified by the read command is not stored in computational cache memory 304, the read operation may return a zero value or other predetermined value indicating that the specified state vector is not stored in computational cache memory 304.

In block 1006, RMW logic 608 is capable of executing the read command. RMW logic 608 is capable of reading the state vector specified by the received read command (e.g., as obtained from read command queue 606) from memory 106. In one aspect, blocks 1004 and 1006 may be performed concurrently. By using one read command queue, read operations (including read/clear operations described hereinbelow) are executed in the requested order so that no subsequent response re-ordering is required. The use of a single read command queue and the priority handling of reads also supports a performance guarantee for read operations.

In block 1008, RMW logic 608 is capable of providing the state vector (or version thereof) read from memory 106 to RMW circuit 302. In block 1010, RMW circuit 302 is capable of combining the version of the state vector obtained from memory 106 with the version of the state vector obtained from computational cache memory 304. Block 1010 ensures that the read command retrieves the latest state vector information.

It should be appreciated that in the case where computational cache memory 304 does not store a version of the state vector specified by the read command, the version of the state vector obtained from memory 106 need not be combined with any other information. In another example, in the case where computational cache memory 304 does not store a version of the state vector specified by the read command, the version of the state vector obtained from memory 106 may be summed with a zero-valued state vector. In block 1012, RMW circuit 302 is capable of providing the result of the combining operation performed in block 1010 to processor 102.

The creation of a zero-valued state vector in computational cache memory 304 performed in response to a cache miss avoids stalling processor 102. For example, if operation of computational cache 108 is waiting for computational cache miss-handler 110 to fetch the state vector from memory 106 in response to the cache miss, operation of computational cache 108 may stall thereby stalling processor 102. By creating the zero-valued state vector in computational cache memory 304 in response to a cache miss and later combining the versions of the state vector as described in FIG. 10, computational cache 108 is capable of continuing operation. Further, any performance penalty incurred is limited to read commands which occur less frequently than RMW commands and less frequently than cache misses.

In addition, due to the writing of zero-valued state vectors to computational cache memory 304 in response to cache misses, when a particular state vector is expelled from computational cache memory 304, RMW circuit 302 must instruct computational cache miss-handler 110 to update the state vector in memory 106. For example, in response to a particular state vector being expelled from computational cache memory 304, RMW circuit 302 is capable of generating an RMW command. The RMW command is provided to computational cache miss-handler 110 for execution to update same state vector that was expelled from computational cache memory 304 in memory 106.

For example, if the state vector expelled from computational cache memory 304 specified a count of five, RMW circuit 302 is capable of generating an RMW command specifying the index of the expelled state vector and indicating the particular modification to be performed. In this example, the modification specified by the RMW command that is generated, upon execution, will increment the state vector stored in memory 106 by five.

In one or more example implementations where the state vectors are used as counters, a read operation, as initiated by a read command from processor 102, may be performed as a read and clear operation. That is, in response to reading a particular state vector, the state vector may be zeroed both in memory 106 (e.g., by RMW execution circuit 506) and in computational cache memory 304 (e.g., by RMW circuit 302).

In one or more other example implementations, where state vectors are used for purposes other than counting events, cache system 104 may be adapted to fetch the state vector from memory 106 in response to a cache miss and store the actual state vector as retrieved from memory 106 in computational cache memory 304. In that case, timestamps may be stored in association with state vectors in computational cache memory 304 and in memory 106 to ensure that the correct version, e.g., the most up-to-date version, of each state vector is retrieved in response to a read command. In scenarios where state vectors are not utilized as counters, read operations may omit the clearing operation.

Figure 11:
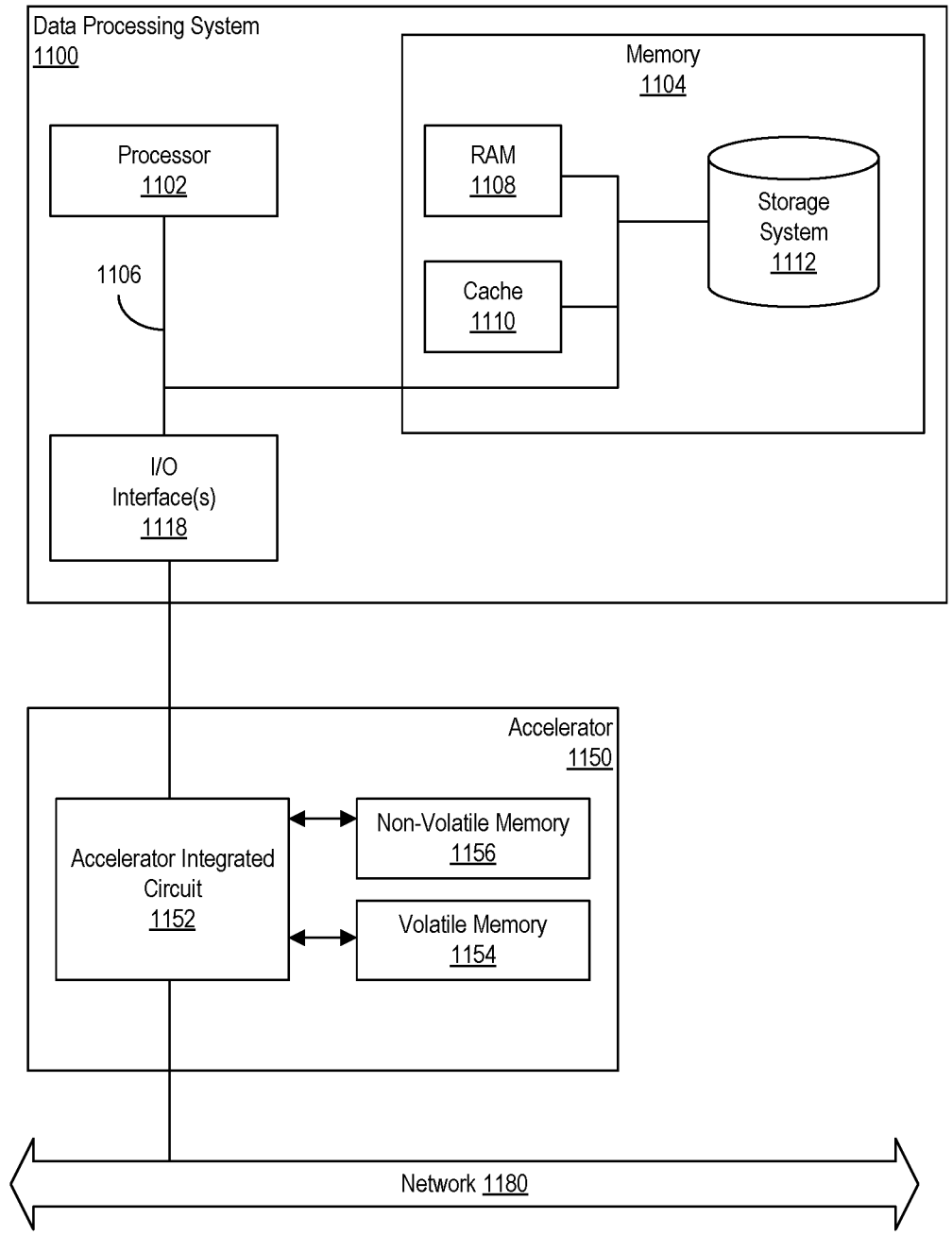
FIG. 11 illustrates an example computing system in which the inventive arrangements may be implemented.

FIG. 11 illustrates an example computing system in which the inventive arrangements may be implemented. As shown, the example computing system includes a data processing system 1100. As defined herein, the term "data processing system" means one or more hardware systems configured to process data, each hardware system including at least one processor and memory, wherein the processor is programmed with computer-readable instructions that, upon execution, initiate operations. Data processing system 1100 can include a processor 1102, a memory 1104, and a bus 1106 that couples various system components including memory 1104 to processor 1102.

Processor 1102 may be implemented as one or more processors. In an example, processor 1102 is implemented as a central processing unit (CPU). Processor 1102 may be implemented as one or more circuits capable of carrying out instructions contained in program code. The circuit may be an integrated circuit or embedded in an integrated circuit. Processor 1102 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1106 represents one or more of any of a variety of communication bus structures. By way of example, and not limitation, bus 1106 may be implemented as a Peripheral Component Interconnect Express (PCIe) bus. Data processing system 1100 typically includes a variety of computer system readable media. Such media may include computer-readable volatile and non-volatile media and computer-readable removable and non-removable media.

Memory 1104 can include computer-readable media in the form of volatile memory, such as random-access memory (RAM) 1108 and/or cache memory 1110. Data processing system 1100 also can include other removable/non-removable, volatile/non-volatile computer storage media. By way of example, storage system 1112 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1106 by one or more data media interfaces. Memory 1104 is an example of at least one computer program product.

Memory 1104 is capable of storing computer-readable program instructions that are executable by processor 1102. For example, the computer-readable program instructions can include an operating system, one or more application programs, other program code, and program data. Processor 1102, in executing the computer-readable program instructions, is capable of performing the various operations described herein that are attributable to a computer. It should be appreciated that data items used, generated, and/or operated upon by data processing system 1100 are functional data structures that impart functionality when employed by data processing system 1100.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1100 may include one or more Input/Output (I/O) interfaces 1118 communicatively linked to bus 1106. I/O interface(s) 1118 allow data processing system 1100 to communicate with one or more external devices such as accelerator 1150 and/or communicate over one or more networks such as network 1180. Network 1180 may be a local area network (LAN) or a wide area network (WAN). For example, network 1180 may be an Ethernet network. In another example, network 1180 may be a public network such as the Internet. Examples of I/O interfaces 1118 may include, but are not limited to, network cards, modems, network adapters, hardware controllers, etc. Examples of external devices also may include devices that allow a user to interact with data processing system 1100 (e.g., a display, a keyboard, and/or a pointing device) and/or other devices such as accelerator card.

Data processing system 1100 is only one example implementation. Data processing system 1100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

In an example implementation, I/O interface 1118 may be implemented as a PCIe adapter. Data processing system 1100 and accelerator 1150 communicate over a communication, e.g., a PCIe communication channel. Accelerator 1150 may be implemented as a circuit board that couples to data processing system 1100. Accelerator 1150 may, for example, be inserted into a card slot, e.g., an available bus and/or PCIe slot, of data processing system 1100.

Accelerator 1150 may include an IC 1152. Accelerator 1150 also may include a volatile memory 1154 coupled to IC 1152 and a non-volatile memory 1156 also coupled to IC 1152. Volatile memory 1154 may be implemented as a RAM. Non-volatile memory 1156 may be implemented as flash memory.

In one aspect, IC 1152 may include cache system 104 to manage state vectors stored in volatile memory 1154. IC 1152 may be used as part of a NIC or other system to process packets and/or data received via network 1180, for example.

In one or more example implementations, processor 102 may be implemented as processor 1102. Memory 106 may be implemented as volatile memory 1154. IC 1152 may implement cache system 104.

In another example implementation, IC 1152 may implement processor 102 and cache system 104. For example, processor 102 may be an embedded processor. The embedded processor may be implemented as a hardened circuit block or using programmable logic. Memory 106 may be implemented as volatile memory 1154.

IC 1152 may be implemented as any of a variety of different types of ICs. For example, IC 1152 may be implemented as a System-on-Chip (SoC), an adaptive IC, a Field Programmable Gate Array, an Application-Specific IC (ASIC), or the like. An adaptive IC is an IC that may be updated subsequent to deployment of the device into the field. The adaptive IC may be optimized, e.g., configured or reconfigured, for performing particular operations after deployment. The optimization may be performed repeatedly over time to meet different requirements or needs.

In one aspect, one or more portions or all of cache system 104 may be implemented as hardened circuitry. In another aspect, one or more portions or all of cache system 104 may be implemented in programmable circuitry (e.g., programmable logic). In another aspect, some portions of cache system 104 may be implemented as hardened circuitry while other portions of cache system 104 may be implemented using programmable circuitry (e.g., programmable logic).

The example of FIG. 11 is not intended to suggest any limitation as to the scope of use or functionality of example implementations described herein. It should be appreciated that the inventive arrangements may be implemented in any of a variety of different systems to manage state vector data structures.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. A computer-readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer-readable storage media. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:
1. A system, comprising:
a cache system including:

a computational cache configured to cache state vectors and perform read-modify-write (RMW) operations on the cached state vectors responsive to received RMW commands; and a computational cache miss-handler configured to perform RMW operations on state vectors stored in a memory responsive to cache misses in the computational cache, wherein the memory is external to the cache system;

wherein the computational cache miss-handler includes a thread assignment circuit configured to assign the RMW commands corresponding to cache misses to threads and an RMW coalescing circuit configured to combine selected RMW commands belonging to a same thread and having a same index into a single RMW command.

2. The system of claim 1, comprising:
a processor configured to submit the RMW commands to the cache system and continue performing one or more other operations without waiting for responses to the RMW commands.

3. The system of claim 1, wherein the computational cache comprises:
an RMW circuit configured to receive the RMW commands; and
a computational cache memory configured to store the cached state vectors;
wherein the RMW circuit is configured to read, from the computational cache memory, the cached state vectors specified by the received RMW commands, modify at least a portion of the cached state vectors resulting in modified state vectors, and write the modified state vectors to the computational cache memory.

4. The system of claim 3, wherein the computational cache comprises:
a mini-cache memory coupled to the RMW circuit;
wherein the RMW circuit is configured to process a plurality of the RMW commands directed to a same cached state vector and occurring within a specified time window using the mini-cache memory.

5. The system of claim 3, wherein the computational cache miss-handler comprises:
an RMW execution circuit configured to, in response to the cache misses in the computational cache, read state vectors specified by the RMW commands from the memory, modify at least a portion of the state vectors resulting in modified state vectors, and write the modified state vectors to the memory.

6. The system of claim 5, wherein, in response to the cache misses, the RMW circuit is configured to create versions of the state vectors in the computational cache memory, wherein the versions of the state vectors created in the computational cache memory, at least initially, are zero-valued state vectors.

7. The system of claim 6, wherein, in response to a read command for a selected state vector,
the RMW execution circuit is configured to read the selected state vector from the memory; and
the RMW circuit is configured to combine the selected state vector read from the memory with a version of the selected state vector stored in the computational cache memory and output a result of the combining as the selected state vector.

8. The system of claim 1, wherein the computational cache miss-handler comprises:
an RMW execution circuit including a plurality of RMW command queues, wherein the RMW execution circuit is configured to store the RMW commands corresponding to the cache misses in the RMW command queues based on thread assignment;
wherein the RMW execution circuit is configured to execute the RMW commands from the plurality of RMW command queues using round-robin arbitration where different ones of the plurality of RMW command queues correspond to different memory banks of the memory.

9. The system of claim 8, wherein the RMW execution circuit includes a single read command queue configured to store read commands, wherein the RMW execution circuit is configured to prioritize execution of a selected read command of a selected thread from the read queue over execution of a selected RMW command of the selected thread.

10. A method, comprising:
receiving, within a cache system, a read-modify-write (RMW) command from a processor; and
in response to the RMW command, performing, using the cache system, an RMW operation on a state vector specified by the RMW command without further involvement of the processor, wherein the performing includes:
assigning the RMW command to a thread of a plurality of threads;
storing the RMW command in a selected RMW command queue of a plurality of RMW command queues based on thread assignment; and
executing the RMW command from the selected RMW command queue according to a round-robin arbitration technique where different ones of the plurality of RMW command queues correspond to different memory banks of a memory.

11. The method of claim 10, wherein the processor is configured to submit the RMW command to the cache system and continue performing one or more other operations without waiting for a response to the RMW command.

12. The method of claim 10, comprising:
receiving a further RMW command within a computational cache of the cache system;
determining that the state vector specified by the further RMW command is stored in a computational cache memory of the computational cache; and
reading, using an RMW circuit of the computational cache, from the computational cache memory, the state vector specified by the further RMW command, modifying at least a portion of the state vector resulting in a modified state vector, and writing the modified state vector to the computational cache memory.

13. The method of claim 12, wherein the further RMW command is one of a plurality of further RMW commands specifying the state vector and received by the computational cache within a specified time window, the method comprising:
using a mini-cache memory coupled to the RMW circuit to process the plurality of further RMW commands.

14. The method of claim 10, wherein the performing, using the cache system, the RMW operation on the state vector specified by the RMW command includes:
in response to determining that the state vector specified by the RMW command is not stored in a computational cache memory of the cache system, reading, using a computational cache miss-handler, the state vector specified by the RMW command from a memory, modifying at least a portion of the state vector resulting in a modified state vector, and writing the modified state vector to the memory.

15. The method of claim 14, wherein, in response to determining that the state vector specified by the RMW command is not stored in the computational cache memory of the cache system, creating a version of the state vector in the computational cache memory, wherein the version of the state vector created in the computational cache memory is, at least initially, a zero-valued state vector.

16. The method of claim 10, comprising, in response to a read command, received from the processor, specifying the state vector,
- reading, by the cache system, the state vector specified by the read command from the memory;
- combining, by the cache system, the state vector read from the memory with a version of the state vector stored in the cache system; and
- outputting, by the cache system, a result of the combining as the state vector.

17. The method of claim 10, comprising:
- combining, by the cache system, the RMW command with at least one other RMW command belonging to a same thread and having a same index into a single RMW command.

18. The method of claim 8, comprising:
- prioritizing execution of a read command of a selected thread over execution of the RMW command, wherein the RMW command is assigned the selected thread.

\* \* \* \* \*